Patented Sept. 19, 1950

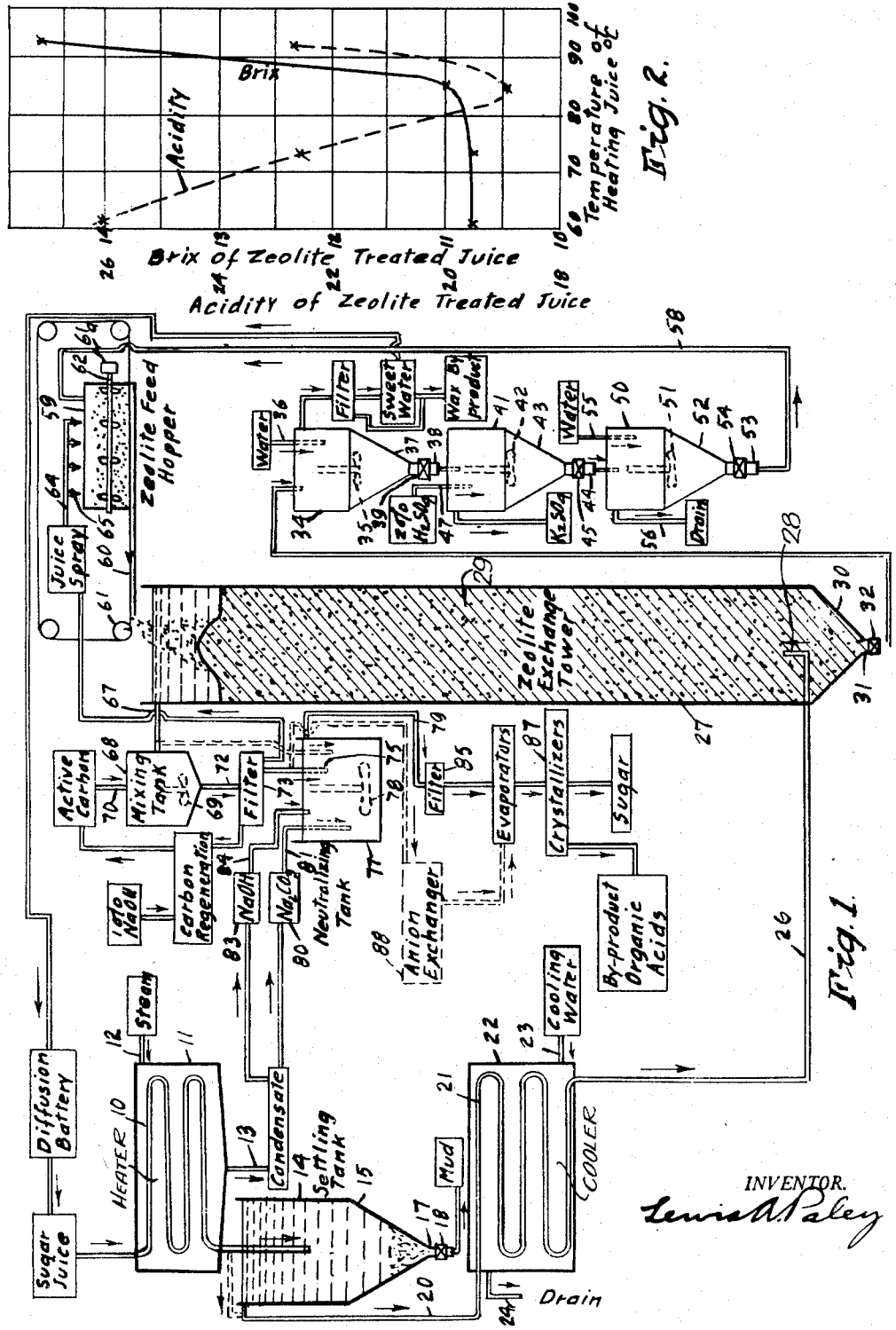

2,522,797

UNITED STATES PATENT OFFICE 2,522,797

METHOD OF PURIFYING SUGAR JUICE

Lewis A. Paley, Aurora, Ill.

Application October 30, 1943, Serial No. 508,448

3 Claims. (Cl. 127—46)

This invention relates to a method of purifying sugar juice. It also relates to an apparatus suitable for practicing the method.

The conventional process of purifying sugar juice comprises heating the juice with lime to precipitate impurities. In the case of beet juice, a large quantity of lime is added and the excess lime is precipitated with $CO_2$ gas, this liming and carbonation being repeated twice. The juice is filtered after the second carbonation and the resulting filtrate still has a decided yellow color. Some authorities contend, and rightly so, that the liming of the raw juice does more harm than good as colored bodies existing in the juice are thrown into solution and make very difficult subsequent efforts to purify the juice. I am satisfied that this preliminary liming of the juice is directly responsible for the production of molasses due to the highly complex melossigenic and colored bodies produced in the juice which prevent the crystallization of sucrose after evaporation. With beet juice, odoriferous material having a bitter taste also is produced by the action of the lime and exists in concentrated form in the molasses, and to a certain extent in the sugar itself.

It has been proposed by the applicant and others, to treat the raw sugar juice directly with hydrogen zeolite in order to remove cations from the juice and produce an acid condition which combined action causes a precipitation of colloids and other non-sugars existing in the juice. I have found, however, that this slimy organic precipitate which is formed is difficult to filter or settle out from the juice. Furthermore, the action of the zeolite causes a serious loss of Brix of as much as 4° in the filtered juice, and the spent regeneration acid usually contains a substantial percentage of sucrose. There seems to be a chemical union between some of the sucrose and some of the non-sugars which causes an uneconomic loss of sucrose by the direct zeolite action on the untreated raw juice. I have also had indications that a chemical body of the probable formula

exists in beet juice which when acted upon by hydrogen zeolite loses its potassium but no acid is set free in the juice by the action of the zeolite. If the potassium were linked in an acid group such as

the hydrogen zeolite would produce an increased acidity in the juice. The action of hydrogen zeolite on raw beet juice also seems to produce invert sugar, even if the juice has been cooled to a temperature of 16° C. at the time of the treatment with the hydrogen zeolite.

Beet juice contains a black substance which comprises largely living plant cells from the beet, each of which consists of a higly colored nucleus surrounded by one or more non-colored protective envelopes. Lime ruptures these envelopes and throws the coloring matter in these nuclei into solution in the juice, producing a dark brown juice. The juice also contains a large amount of bacteria so that the juice quickly spoils if allowed to stand for a few hours at normal temperature.

By heating or pasteurizing beet juice before treatment with hydrogen zeolite, the living plant cells and bacteria are killed so that the juice becomes sterile and has better keeping qualities during the subsequent cooling of the juice, which, in my improved process, follows the heating step. The heating of the juice also apparently causes the non-sugar bodies to split away from the sucrose so that no loss of sucrose or Brix exists in the zeolite treated juice. In fact, an increase of Brix in the zeolite treated and filtered juice frequently takes place, especially when the preliminary heating of the juice is done at a temperature of 85–100° C. Furthermore, the filterability and settling qualities of the pasteurized and zeolite treated juice is much improved over raw juice which has not been pasteurized before treating with zeolite. Also the spent and washed hydrogen zeolite does not contain sucrose in the thermical combination, so that the spent regeneration acid contains little or no sucrose. The initial pasteurization step also tends to considerably reduce the invert sugar in the zeolite treated juice.

The invention also includes the steps of treating the pasteurized zeolite treated and filtered juice with active carbon to (1) Remove all color.
(2) Remove remaining colloids.
(3) Remove a portion of the acids produced by the action of the zeolite.

The removal of a portion of the acids by the active carbon makes it practical to neutralize the remaining acid with a basic material such as sodium hydroxide or sodium carbonate, producing only voluble salts which do not encrust the evaporators and remain in solution in the mother liquor after the crystallization of the sucrose. The neutralization of the acid juice following treatment with active carbon and filtering, may cause a slight turbidity due to precipitation of remaining colloids at the high pH. This alkaline juice may be filtered again, using diatomaceous earth (filter aid) if necessary, so as to produce a slightly alkaline, clear, water-white juice suitable for evaporation. This purified juice produces little or no molasses on evaporation and crystallization of the sucrose.

My invention also embodies other important features of the apparatus for practicing the process. These features include the continuous treatment of a stream of the juice with a counter-current stream of hydrogen zeolite. The zeolite is also used as a mechanical filter to remove the slimy precipitate from the juice. An apparatus suitable for the washing and regeneration of zeolite-precipitate mixture is also claimed. The recovery of by-products at different points in the process is also indicated.

Reference is to be had to the accompanying drawings forming a part of this application in which:

Fig. 1 is a partly diagrammatic flow sheet showing the apparatus used in carrying out the process, and Fig. 2 is a graphical representation of certain aspects of the process.

In brief, my process in its complete form comprises the following steps:

1. Pasteurization of raw juice.
2. Cooling the juice.
3. Treating the juice with hydrogen zeolite.
4. Separating the slimy precipitate from the juice.
5. Treating the juice with active carbon and filtering.
6. Neutralizing the acid in the juice.
7. Filtering the juice.
8. Evaporating the juice.

As an example, raw diffusion beet juice is passed continuously through a tube heating coil 10 which is enclosed by an insulated chamber 11 into which steam is passed through pipe 12. Water condensed from the steam passes from chamber 11 through a pipe 13 and is used for the preparation of caustic soda solution used later in the process for the neutralization of acid juice.

The heated juice from coil 10 flows into a tank 14 where a sufficient time interval is provided for the heat treatment or pasteurization of the juice. The juice temperature at this point should be 55–100° C. depending somewhat on the holding time of the juice in tank 14. This tank 14 preferably has a conical bottom 15 which collects any solids settling from the juice as a result of the heat treatment, such as soil which exists in cane juice due to the manner of harvesting, which may be mixed with colloids. This mud may be drawn off from the conical bottom 15 from time to time by means of a pipe 17 having a quick opening valve 18. The use of the tank 14 is optional and it may be omitted under some conditions.

The juice from tank 14 overflows or is decanted through a pipe 20 and passes into a cooling coil 21 which is contained in a tank 22 into which cooling fluid, such as water or refrigerant, is passed through pipe 23 and out again through pipe 24. The juice leaving the coil 21 should have a temperature of 25° C. or less in order to prevent inversion of the sucrose under the acid conditions prevailing in the subsequent treatment with hydrogen zeolite.

The juice now passes through pipe 26 into a vertical tower 27 near the bottom thereof, the pipe 26 terminating in an upwardly directed jet 28 inside the tower 27. A column of hydrogen zeolite 29 is contained in the tower 27, being continuously fed into the top of the tower 27 by an apparatus to be described, and continuously or intermittently discharged from a conical bottom 30 on the bottom of tower 27 through a pipe 31 provided with a quick opening valve 32. If desired, a conical discharge screw may be used at the bottom of tower 27 to discharge the spent zeolite. Such a screw would be used when powdered zeolite is employed which does not flow easily through a pipe line. Granular zeolite may be used when a pipe and valve is employed for discharge, as it flows readily because of the lubricating liquid between the granules of zeolite. Slightly higher sucrose content is experienced in the spent zeolite when using the granular form of zeolite because of this liquid between the granules.

The action of the zeolite on the juice is to remove all cations which are mainly potassium, some magnesium and slight calcium. The zeolite also causes the juice to become acid, having a pH of 2–3. The cation removal and acid condition causes the precipitation of substantially all of the colloids and organic matter as a slimy precipitate. As the juice percolates upwardly through the downwardly moving column of zeolite, the zeolite acts as a mechanical filter to remove this precipitate from the juice. In view of the fact that the flow of the juice is upwardly, this precipitate cannot cause packing of the zeolite and shunt off or restrict the flow of juice, as it would if the flow of juice were downwardly through the zeolite.

The mixture of the zeolite and slimy precipitate discharged from pipe 31 is run into a tank 34 which is provided with an agitator 35 and a water inlet pipe 36. The zeolite settles into a conical bottom 37 on tank 34 and is continuously or intermittently withdrawn through a pipe 38 which is provided with a quick opening valve 39. The action of the water is to float off the organic precipitate from the zeolite and this water-precipitate mixture may pass to a filter to remove the precipitate from the sweet water, the latter being used in the diffusion battery or as maceration water, to conserve its sucrose content. The organic precipitate may be dried and then extracted with organic solvents to recover waxy materials or other by-products of value.

The zeolite discharges from pipe 38 into a regeneration tank 41 having an agitator 42, conical bottom 43, outlet pipe 44, and control valve 45. Regenerating acid, such as 2% $H_2SO_4$, is introduced into tank 41 through a pipe 47. After regeneration, the spent acid overflows from tank 41 through a pipe 48 and may be treated to recover by-products, such as $K_2SO_4$.

The zeolite discharges from pipe 44 into a washing tank 50 which is provided with an agitator 51, conical bottom 52, discharge pipe 53 and control valve 54. Water is continuously run into the tank 50 through a pipe 55 and overflows through a pipe 56 to the drain. The washed zeolite discharged from pipe 53 is now ready for recycling.

A conveyor 58, such as a bucket conveyor, receives the regenerated and washed zeolite from pipe 53 and conveys it to a feed hopper 59 positioned near the top of tower 27. A drag conveyor 60, preferably of the chain type, continuously passes around sprockets 61 through the hopper 59 to drag out a stream of zeolite from said hopper and drop it into the tower 27 to keep the level of zeolite in said tower substantially uniform. An agitator shaft 62 is rotatably mounted in hopper 59 longitudinally of the conveyor 60 and is rotated by a power pulley 61a or other suitable means. In order to prevent the zeolite from arching over the agitator 62 and stopping the flow of zeolite, I spray purified juice on top of the zeolite in hopper 59 through pipe 64 having spray nozzles 65. The action of this juice in combination with the agitator, is to keep the zeolite in a mobile, free flowing condition. Without this spray provision, the zeolite is difficult to feed because of its arching tendency.

The juice which percolates counter-currently up through the downwardly moving column of zeolite, overflows near the top of tower 27 through a pipe 67 and into a mixing tank 68 provided with an agitator 69 and a conveyor 70 for continuously introducing active carbon into said tank 68. The action of the active carbon is to remove colloids, some of the acid, and any trace of color left in the juice. The juice continuously flows from tank 68 through a pipe 72 to a filter 73 of suitable conventional type which removes the carbon. The filtered juice from filter 73 will be crystal clear and water white but will be slightly acid in reaction.

This clarified juice flows from filter 73 through a pipe 75 and may be treated in either of two ways, viz.:

(1) By neutralization with an alkaline material such as NaOH and/or Na$_2$CO$_3$ to produce soluble sodium salts of the acids which do not encrust the evaporators, or (2) By an anion exchange resin, or metal oxide which removes the acid, probably by adsorption. I prefer to use the neutralization method as the initial high cost of the resin anion exchanger is avoided and the process is simplified from an operating standpoint.

For neutralization, the juice from pipe 75 flows into the bottom of a mixing tank 77, said tank being provided with an agitator 78 and overflow pipe 79. Sodium carbonate solution flows from a supply tank 80 through a pipe 81 into the bottom of tank 77 to neutralize the bulk of the acid in the juice. This acid will consist of a mixture of mineral and organic acids. To neutralize the balance of the acid, a solution of sodium hydroxide is run from a supply tank 83 through pipe 84 into the top of tank 77 where the pH of the juice is raised to 7.5 to 9.0 suitable for evaporation without inversion of the sucrose. This neutralization usually causes a slight precipitation of colloids due to the high pH, so the juice is again filtered through filter 85 and is run to evaporators 86 to be evaporated, then to crystallizers 87 to crystallize the sucrose. The mother liquor from crystallizers 87 contains the sodium salt of organic and inorganic acids, and some of the organic acid salts may be recovered from this mother liquor for their by-product value.

In the graphical chart of Fig. 2, the effect of the temperature of initially heating beet juice is plotted against the Brix and acidity of the juice after the zeolite treatment and filtering. It will be noted that the Brix remains substantially constant between the temperatures 60–85° C. while during the same temperature range, the acidity of the juice rapidly decreases. 85° C. seems to be a critical temperature and at 93° C., both Brix and acidity have sharply increased. It is, of course, desirable to use a heating temperature of the juice where the Brix is not lowered from the original Brix of the juice, which was 10.5 and where the acidity is minimum, so that the least amount of sodium salts will be left in the juice as a result of the neutralization step.

I have repeatedly experienced a drop in Brix of 4° when treating raw beet diffusion juice with hydrogen zeolite and filtering. The heating step entirely eliminates this loss of Brix upon zeolite treatment and makes the process economic as no sucrose is lost from chemical union with non-sugar precipitated impurities and in the spent zeolite itself. The effect of the active carbon treatment of the zeolite treated juice is to lower the acidity of the juice about 7 to 9 units of titrated acidity or about 34–37%. Both organic and inorganic acids are removed by the active carbon, and color and some colloids are also removed.

While I prefer to use sodium carbonate and/or hydroxide to neutralize the acid in the juice, other bases may be used such as magnesium hydroxide or lime. Lime is less desirable because of its habit of encrusting the evaporators, but more desirable because it precipitates non-sugar impurities as their insoluble calcium salts. Certain steps in the process are optional, and dotted lines indicate the path of the juice in a simpler but less efficient process. Thus the settling, and active carbon treatments are considered optional, and dotted lines to the anion exchanger 85 indicate a modified form of the process where neutralization is not used. In the claims to follow, the use of the word "juice" is intended to include the broader term "solution."

A drag conveyor in an inclined trough may be used for the zeolite treatment of the juice, or for the regeneration of the zeolite. Other treatments for sterilizing the juice may be used, such as ultra violet ray treatment, injection of SO$_2$ or Cl into the raw juice or treatment with an antiseptic, such as formaldehyde or soluble silver salts. Pasteurization of the juice is preferred. Instead of the zeolite column, the sterilized juice may be treated in a suitable continuous mixing device followed by settling and/or filtration of the precipitate from the juice. In the claims, "hydrogen zeolite" comprises cation exchange resins or other materials operating on the hydrogen cycle.

I would state in conclusion that while the examples illustrated and described constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. The method of purifying raw sugar juice, which comprises heating said juice to a temperature of 60–85° C., cooling said juice to a temperature of less than 25° C. and treating said juice with hydrogen zeolite to a pH of 2–3 to form a precipitate and remove cations from said juice, separating the precipitate from said juice, treating said juice with active carbon, filtering said juice, neutralizing the remaining acidity in said juice with an alkaline material, and filtering colloids from said juice precipitated by said alkali.

2. The steps in the method of purifying raw sugar juice, which comprises heating said juice in the absence of lime to a temperature of 60–80° C. to prevent loss of Brix in a subsequent treatment with hydrogen zeolite, subjecting said treated juice to the action of hydrogen zeolite to remove cations, produce a pH of 2–3 and precipitate organic matter, separating non-sugar impurities from said juice, and neutralizing acid in said juice with an alkaline material.

3. The steps in the method of purifying raw sugar juice, which comprises heating said juice in the absence of lime to a temperature of 60–85° C. to prevent loss of Brix in a subsequent treatment with hydrogen zeolite, subjecting said juice to the action of hydrogen zeolite to remove cations, produce a pH of 2–3 and precipitate organic matter, separating non-sugar impurities from said juice, treating said juice with active carbon to remove coloring matter, colloids and part of the acid, and neutralizing the remainder of the acid in said juice.

LEWIS A. PALEY.

REFERENCES CITED

The following references are of record in the file of this patent:

UNITED STATES PATENTS

| Number | Name | Date |
|---|---|---|
| 141,068 | Morrell | July 22, 1873 |
| 246,285 | Bonnefin | Aug. 30, 1881 |
| 329,331 | Matthiessen | Oct. 27, 1885 |
| 805,081 | Lewicki | Nov. 21, 1905 |
| 1,054,460 | Schweikert | Feb. 25, 1913 |
| 1,094,436 | Gordon | Apr. 28, 1914 |
| 1,724,376 | Schreiber | Aug. 13, 1929 |
| 1,752,339 | Green | Apr. 1, 1930 |
| 1,770,580 | Neumann | July 15, 1930 |
| 1,787,502 | Wickenden et al. | Jan. 6, 1931 |
| 1,903,612 | Dotterweich | Apr. 11, 1933 |
| 1,956,260 | Wadsworth | Apr. 24, 1934 |
| 2,191,365 | Boyd | Feb. 20, 1940 |
| 2,359,902 | Dahlberg | Oct. 10, 1944 |
| 2,372,233 | Thurston | Mar. 27, 1945 |
| 2,402,960 | Gustafson et al. | July 2, 1946 |

FOREIGN PATENTS

| Number | Country | Date |
|---|---|---|
| 116,691 | Australia | Mar. 24, 1943 |
| 117,410 | Australia | Sept. 2, 1943 |

OTHER REFERENCES

Sugar, July 1947, "The Ion Exchange Process Has Matured," American Cyanamid Co., page 28.

Weitz: "Juice Purification by Ion Exchange as Applied at the Isabella Sugar Co.," Sugar, Jan. 1943, pages 26–31.

Myers: "Synthetic Resins as Exchange Adsorbents," Ind. and Eng. Chem., June 1941, pages 697–706.

Myers: "Synthetic Resin Ion Exchangers Advances in Colloid Science," 1942, pages 317–351.

"Collectavit" by Keppeler & Radbruch. Int. Sugar Journal, October 1921, page 317.

Boyd: "Decolorizing Filter Aids," Ind. and Eng. Chem., June 1942, pp. 744–749.

Ser. No. 359,575, Smit (A. P. C.), published May 11, 1943.